United States Patent

Slown

[15] 3,648,866
[45] Mar. 14, 1972

[54] HOIST AND FRAME FOR BOAT AND TRAILER

[72] Inventor: Harold M. Slown, 1648 S. Washington, Wichita, Kans. 67211

[22] Filed: May 18, 1970

[21] Appl. No.: 38,435

[52] U.S. Cl. ............................................. 214/450, 214/85.1
[51] Int. Cl. .................................................. B60r 9/00
[58] Field of Search ...................... 214/450, 85, 85.1

[56] References Cited

UNITED STATES PATENTS

| 2,188,374 | 1/1940 | Sanchez | 214/85.1 |
| 3,411,644 | 11/1968 | Cook | 214/450 |
| 2,765,938 | 10/1956 | Di Addezio | 214/85.1 |

Primary Examiner—Gerald M. Forlenza
Assistant Examiner—John Mannix
Attorney—John H. Widdowson

[57] ABSTRACT

This invention is a hoist and frame for a boat and trailer including a frame mountable on the bed of a truck having a hoist and a ramp assembly temporarily mountable with the frame. More particularly the invention is a frame for carrying in mounted position on a truck a conventional boat mounted on a conventional and popular design trailer.

2 Claims, 6 Drawing Figures

INVENTOR.
HAROLD M. SLOWN
BY
John H. Widdowson
ATTORNEY

PATENTED MAR 14 1972 3,648,866

INVENTOR.
HAROLD M. SLOWN

BY
John H. Widdowson
ATTORNEY

HOIST AND FRAME FOR BOAT AND TRAILER

Numerous means are known in the prior art to mount and carry a boat on a truck, car or similar vehicle. However, these prior art devices require the use of specially designed trailers or carrying devices and have quite complicated means of attaching the carrier and its associated supporting structure to the vehicle. Additionally, these prior art devices are generally limited to use with small and lightweight craft due to structural load limitations imposed by the carrying vehicle and the position in which the craft is carried.

The hoist and frame for boat and trailer of this invention provides, in one preferred specific embodiment, an apparatus mountable with a conventional pickup truck including elevated rail members and a guide member with supporting structure adapted to mount a boat with conventional trailer thereon. The structure thereof is mountable on the bed portion of a pickup truck and having a ramp mountable with the rails and a hoist operable to aid in loading and unloading purposes. The structure includes vertical members mountable with the existing side rails mounts of the conventional pickup and attaching transverse members supporting the end portions of the rails and the guide member in the elevated position. The rails have the forward end thereof adjacent the top of the truck cab and the rear end thereof substantially lower. The rails and guide member have holding devices thereon to hold the trailer in a fixed position thereon. The hoist and ramp members are used primarily in loading and unloading operations. The ramp preferably has two trough members mountable with the rails to extend directly behind the truck and guide the wheels of the trailer as it moves thereon. The hoist is used to pull the trailer up the ramp and rails when loading or restrain its motion in rolling down same when unloading.

One object of this invention is to provide a hoist and frame for a boat and trailer overcoming the aforementioned disadvantages of the prior art devices.

Still, one other object of this invention is to provide a structure to carry a boat with a conventional trailer on a conventional pickup truck in a manner which will allow a trailer such as a camping trailer, utility trailer, etc., to be easily pulled by the pickup truck.

Still another object of this invention is to provide a hoist and frame for a boat and trailer with which a boat mounted with a conventional type trailer can be easily and relatively rapidly loaded thereon and unloaded therefrom.

An additional object of this invention is to provide a structure which can support a boat and trailer on a pickup truck and can be easily removed therefrom when not in use thereby not restricting usage of the pickup truck.

Various other objects, advantages, and features of the invention will become apparent to those skilled in the art from the following discussion, taken in conjunction with the accompanying drawings, in which.

Figure 1:
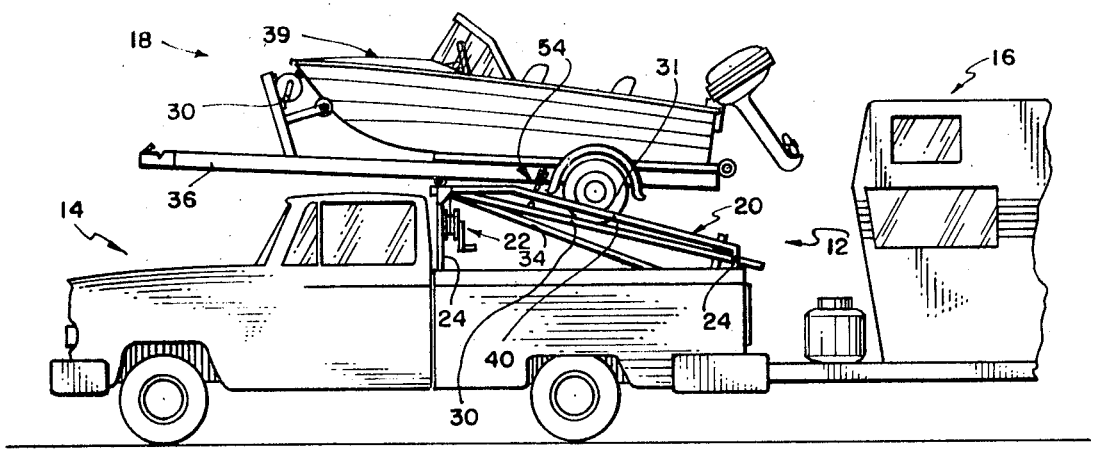
FIG. 1 is a segmental side elevational view of a conventional pickup truck having the hoist and frame of this invention mounted thereon with a boat and trailer thereon in the normal road carrying position and with the pickup shown attached to a camping trailer.
Figure 2:
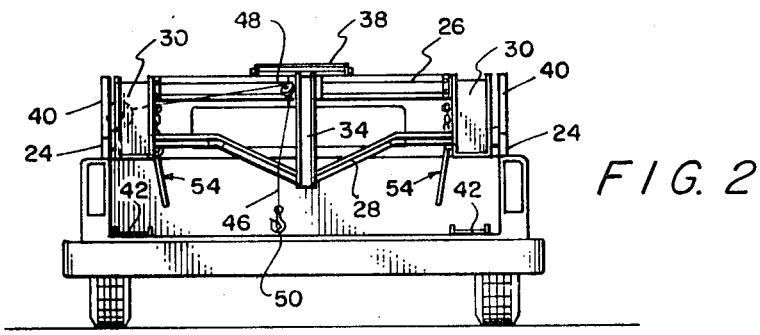
FIG. 2 is a rear elevation view of a pickup having the hoist and frame thereon.
Figure 3:
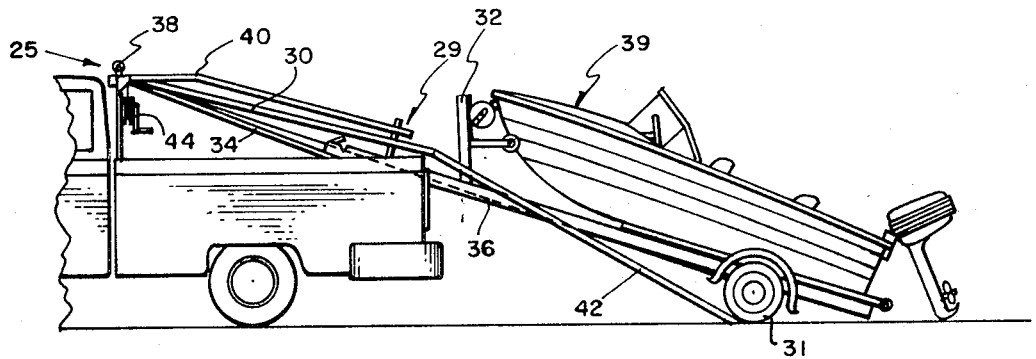
FIG. 3 is a side elevational view of a pickup having the hoist and frame thereon with ramp members attached thereto and having the boat and trailer positioned at the extended end of the ramp members.

The following is a discussion and description of preferred specific embodiments of the hoist and frame for boat and trailer of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the hoist and frame for boat and trailer of this invention, generally indicated at 12, is shown mounted with a conventional pickup truck 14 which is coupled with a camping tailer 16; a conventional boat and trailer 18 are loaded on the frame 12. The hoist and frame for a boat and trailer 12 includes a frame structure, indicated at 20, and a hoist apparatus generally indicated at 22.

Figure 5:
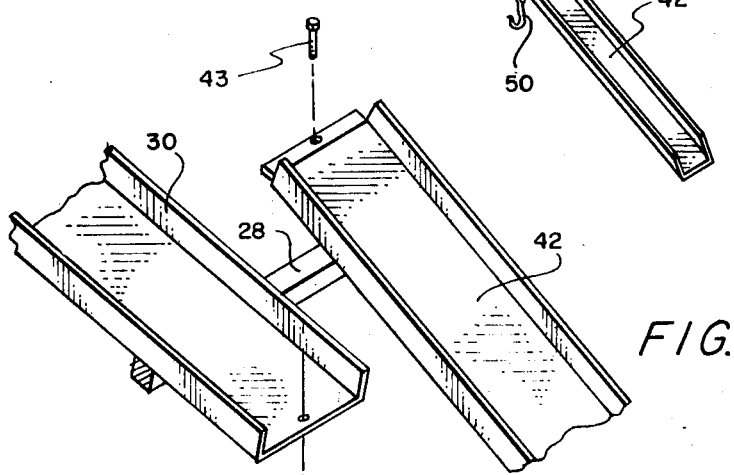
FIG. 5 is an enlarged and exploded segmental perspective view of the attachment joint of the rail structure and a ramp member.
Figure 6:
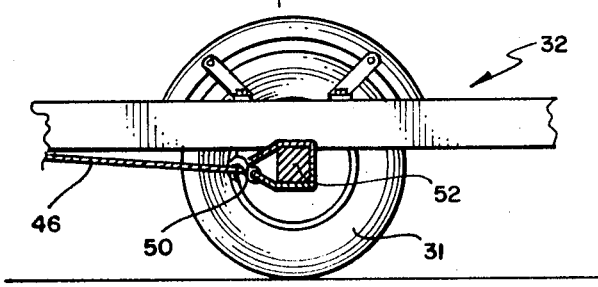
FIG. 6 is a segmental view of the boat trailer showing the attachment of the hoist cable with the axle of the boat trailer.

The frame structure 20 includes vertical members 24 which support the structure 20 and mount in the existing side rail holders of the conventional pickup 14. The vertical members 24 attach cross members 26 and 28 which transversely span the forward and aft ends of the pickup bed; the forward end portion 25 of the frame 20 higher than the aft end portion 29. A pair of trough shaped rail members 30 are mounted in a parallel spaced relation on the cross members 26 and 28 and parallel with the pickup bed operable to receive the wheels 31 of the trailer 32. In the center of the cross members 26 and 28 is another trough shaped member, the guide member 34, which is operable to guide the tongue 36 of the trailer 32 during the loading and unloading operations as will be explained. A roller member 38 is mounted above the center portion of the forward cross member 26 preferably spaced above the cab of the pickup 14. The roller 38 contacts the trailer tongue 36 generally below the forward portion of the keel of the boat 39. On the forward end 25 the frame 20 is vertically highest providing sufficient clearance over the cab of the pickup truck 14 to prevent the trailer tongue 36 from touching same. The aft end 29 is the lower end with the rails 30 supported on the end portions of the cross member 28 and the guide member 34 supported from the apex of the V-shaped center portion 35 of the cross member 28. The forward 25 and aft 29 ends of the frame 20 are joined by side support members 40 joining the ends of the forward cross member 26, extending rearward and downward joining the ends of the aft cross member 28 and the vertical members 24 on both ends thereof. The rails members 30 preferably extend rearward past the aft cross member 28 and have means to join the similar trough shaped ramp members 42. The ramp members 42 attach the rail members 30 by means of a lap joint, as shown in FIG. 5, and are held by a pin member 43.

The hoist apparatus 22 of this invention includes a winch 44, with cable 46 and pulley assembly 48. The winch 44 is preferably mounted on one of the forward end vertical members 24 for easy operation of same. In practice a hand operated winch has been found to provide adequate for a moderate size of boat and trailer. The pulley assembly 48 is mounted on the corresponding side of the guide member 34 as the winch 44 and on the cross member 26 near the guide member 34. The pulley assembly 48 has a pulley held in a clevis and mounted free to pivot vertically and horizontally. The cable 46 is provided with a hook 50 on the end thereof to provide means to attach same to the trailer 32.

Figure 4:
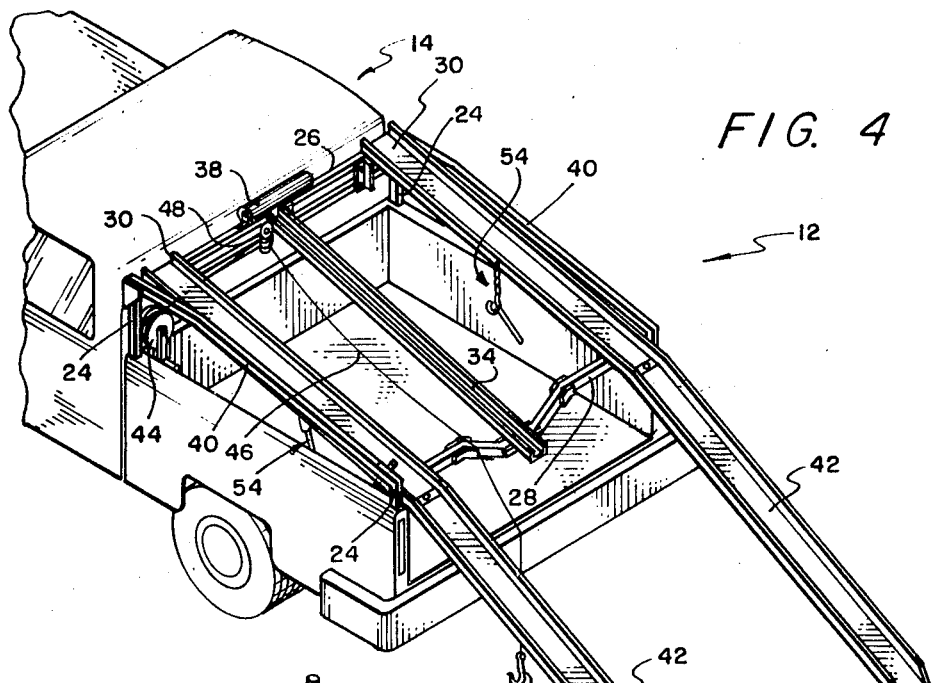
FIG. 4 is a segmental perspective view of the rear of a pickup having the hoist and frame thereon with the ramp members mounted thereon and extending therefrom.

FIG. 4 shows in detail the hoist and frame for boat and trailer 12 of this invention with the ramp members 42 attached thereto without a boat 39 or trailer 32. The ramp members 42 extend directly beyond the rear of the pickup 14 a substantial distance to provide easy loading and unloading of the boat 39 and trailer 32 without scraping either on the ground surface. When loading the frame 20 with the boat 39 and trailer 32, the trailer wheels 31 are aligned directly in line with the ramp members 42; the forward end of the tongue 36 is placed in the rear end portion of the guide member 34; the cable 46 is looped around the axle 52 of the trailer 32; then the cable 46 is pulled in by the winch 44. The trailer 32 moves up the ramp members 42 and rail members 30 into the position shown in FIG. 1, then clamp members 54, having one end mounted with the rail, are attached with the structure of the trailer 32 to hold it in place. The tongue 36 can be secured to the guide member 34 and roller 38 by detaching the cable 46 from the trailer axle 52, looping it about the trailer tongue 36, roller 38, cross member 26 and guide member 34 and tightening same, this prevents motion of the forward portion of the trailer 32 when the pickup 14 is in motion. When the boat and trailer are mounted on the frame 20 the ramp members 42 can be easily detached from the rails 30 and stored in the bed of the pickup 14 until needed again. The preferred procedure in unloading the boat and trailer from the frame 20 is substantially the reverse of that described above.

In the manufacture of the frame structure 20 of this invention, it is obvious that it can be constructed of steel, aluminum or similar materials to provide a sufficiently strong structure to safely support and carry the boat 39 and conventional boat trailer 32 thereon.

In use and operation of the hoist and frame for a boat and trailer 12 of this invention, it is seen that same provides a frame structure 20 easily mountable with and detachable from a conventional pickup truck 14 and a structure which can easily mount and carry a boat 39 with a conventional boat trailer 32. The hoist apparatus 22 permits the boat trailer 32 to be easily pulled up on the frame structure 20. The use of the hoist and frame for a boat and trailer 12 of this invention it is seen that is easily solves a major problem for a person who enjoys boating and camping, that is how to travel with a boat, boat trailer and a camping trailer simultaneously.

As will become apparent from the foregoing description of the applicant's hoist and frame for boat and trailer, relatively inexpensive, safe and convenient means have been provided to readily carry a conventional boat and trailer on a conventional pickup. The preferred structure is not complicated or expensive to manufacture and is not restricted to any particular boat or trailer design.

While the invention has been described in conjunction with preferred specific embodiments thereof, it will be understood that this description is intended to illustrate and not limit the scope of the invention, which is defined by the following claims.

I claim:
1. A hoist and frame for boat and trailer, comprising:
   a. a frame means having means to removably mount same on the bed portion of a truck and ramp means to receive thereon a boat mounted on a boat trailer;
   b. a hoist means mounted with said frame means;
   c. said ramp means with said frame means having a storageable portion disalignable therefrom; said hoist and frame for boat and trailer in operation adapted to carry in mounted position thereon said conventional boat and trailer with said hoist and frame for boat and trailer mounted on said truck;
   d. said frame means mountable with the bed means of said conventional pickup truck includes a pair of rail members thereon to receive the wheels of said conventional trailer; a guide member of U-shape in transverse cross section to receive a tongue member of said conventional trailer for centering and guiding said tongue member; holding means to restrain said trailer in a substantially fixed position relative said frame means; and means to removably mount said ramp means with said rail members;
   e. said hoist means has a winch apparatus mounted with the forward portion of said frame means and has a cable member of said hoist means positioned to move relatively alongside said guide member, and said cable member operable to attach said conventional trailer operable for loading and unloading purposes; and
   f. said ramp means is a pair of trough member, each releasably connectable with respective ones of said rail members.

2. A hoist and frame for a boat and trailer as described in claim 1 wherein:
   a. said frame means has vertical members mounted within the existing side rail devices of said conventional pickup bed means and said frame means has crosswise support members to support said guide member and said rail members at the forward end portion thereof and the rear end portion thereof, said rail members and said guide member have the forward portion of same substantially higher relative said rear end portion of same;
   b. said cable is attachable with the axle member of said trailer for loading and unloading same;
   c. said holding means has a clamp member mounted with each of said rail members having one end thereof mounted with said rail member and one end secured to said trailer in the loaded condition;
   d. said trough members are connectable with the rear end portion of said rail members by pin members and have sufficient length to contact a ground surface at a substantial distance behind said pickup to allow said boat and conventional trailer to traverse same said ramp means without contacting said ground surface; and
   e. said frame means having a roller member positioned centrally of said rail members and above the driver's cab of the pickup truck to receive said tongue member thereon and maintain said trailer out of contact with the driver's cab.

* * * * *